US010512246B2

(12) United States Patent
Renforth et al.

(10) Patent No.: US 10,512,246 B2
(45) Date of Patent: Dec. 24, 2019

(54) NAIL OR CLAW TRIMMER FOR USE WITH PETS

(71) Applicant: DOSKOCIL MANUFACTURING COMPANY, INC., Arlington, TX (US)

(72) Inventors: Jack William Renforth, Arlington, TX (US); Ann Hanson, Ionia, MI (US); Mark Charles Kitchens, Athens, TX (US); Regis Marie-Jean Wandres, Athens, TX (US)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 1331 days.

(21) Appl. No.: 13/758,570

(22) Filed: Feb. 4, 2013

(65) Prior Publication Data

US 2013/0220232 A1 Aug. 29, 2013

Related U.S. Application Data

(60) Provisional application No. 61/594,121, filed on Feb. 2, 2012.

(51) Int. Cl.
*A01K 13/00* (2006.01)

(52) U.S. Cl.
CPC .................... *A01K 13/00* (2013.01)

(58) Field of Classification Search
CPC ......... A01K 13/00; A45D 29/05; A45D 29/14
USPC ....... 119/600, 608, 609, 610; 132/73.6, 75.8
See application file for complete search history.

(56) References Cited

U.S. PATENT DOCUMENTS

| 2,389,665 | A | * | 11/1945 | Hyman | A45D 29/05 |
| | | | | | 132/75.8 |
| 4,016,890 | A | * | 4/1977 | Fiorenza, Sr. | A45D 29/05 |
| | | | | | 132/75.6 |
| 4,753,253 | A | * | 6/1988 | Hutson | A45D 29/05 |
| | | | | | 132/73.6 |
| 4,800,606 | A | * | 1/1989 | Kolesky | A45D 29/007 |
| | | | | | 132/73.6 |
| D307,194 | S | * | 4/1990 | Chou Fargo | D28/58 |
| 5,725,000 | A | * | 3/1998 | Rice | A45D 24/007 |
| | | | | | 119/609 |
| 5,819,757 | A | * | 10/1998 | Baekkelund | A01K 13/00 |
| | | | | | 132/73.6 |
| 6,050,270 | A | * | 4/2000 | Tyshenko, Jr. | A45D 29/05 |
| | | | | | 132/73.6 |
| 6,178,970 | B1 | * | 1/2001 | Purifoy | A61B 17/54 |
| | | | | | 132/73.5 |
| 6,865,812 | B1 | * | 3/2005 | Martin, Jr. | 30/27 |

(Continued)

*Primary Examiner* — Tien Q Dinh
*Assistant Examiner* — Brady W Frazier
(74) *Attorney, Agent, or Firm* — Global IP Counselors, LLP

(57) ABSTRACT

An improved trimmer is structured to be held in the palm of a user's hand. The trimmer has a grinding drum that is advantageously structured to be situated in a palmar region of the user's hand that can be said to extend from the palm and to be generally bounded by the fingertips. When the trimmer is held in the palmar region, the thumb and certain fingers can support the trimmer, and other fingers that are not necessarily employed in supporting the trimmer are usable to operate a control switch of the trimmer. The control switch controls operation of a drive motor that is connected with a grinding drum which provides abrasive surfaces that are engageable with the animal nail or claw.

17 Claims, 4 Drawing Sheets

(56) References Cited

U.S. PATENT DOCUMENTS

| | | | |
|---|---|---|---|
| 7,267,125 B2* | 9/2007 | Nevakshonoff | A45D 29/14 132/73.6 |
| 2003/0102002 A1* | 6/2003 | Cho | A45D 29/05 132/73.6 |
| 2006/0137703 A1* | 6/2006 | Kling | A45D 29/05 132/73.6 |
| 2006/0260629 A1* | 11/2006 | Chern | A45D 29/05 132/73.6 |
| 2006/0289025 A1* | 12/2006 | Nevakshonoff | 132/73.6 |
| 2007/0089686 A1* | 4/2007 | Drelinger | A01K 13/00 119/609 |
| 2007/0186867 A1* | 8/2007 | Mulloy | A01K 13/00 119/601 |
| 2008/0099032 A1* | 5/2008 | Jackson | A01K 13/00 132/200 |
| 2009/0154985 A1* | 6/2009 | Wyatt | A45D 40/265 401/126 |
| 2010/0000557 A1* | 1/2010 | Keene | 132/73.6 |
| 2010/0236565 A1* | 9/2010 | Fernandez | A45D 29/05 132/73.6 |
| 2010/0242983 A1* | 9/2010 | Richmond | A45D 1/04 132/211 |
| 2011/0226268 A1* | 9/2011 | Filonczuk | A45D 29/05 132/73.6 |
| 2011/0226270 A1* | 9/2011 | Rivera | 132/73.6 |

* cited by examiner

NAIL OR CLAW TRIMMER FOR USE WITH PETS

CROSS-REFERENCE TO RELATED APPLICATION

This application claims priority from U.S. Provisional Patent Application Ser. No. 61/594,121 filed Feb. 2, 2012, and entitled "Nail or Claw Trimmer for Use with Pets", the disclosures of which are incorporated herein by reference.

BACKGROUND

Field

The disclosed and claimed concept relates generally to nail trimming equipment and, more particularly, to grinding equipment for trimming the claws or nails of an animal.

Related Art

Numerous devices are known for use in trimming, grinding away, shaping, unsharpening, and otherwise manicuring the nails or claws of pets such as dogs, cats, and the like. Such devices can be said to include clippers that translate one structure with respect to another structure to shear away a portion of an animal claw. Such devices can be said to further comprise elongated motor-operated grinders which grind away portions of an animal claw.

While such devices have been generally effective for their intended purposes, they have not been without limitation. Pet owners and caregivers typically wish to avoid creating anxiety in an animal, and it is understood that the trimming of an animal's claws typically can tend to cause anxiety in the animal. As such, claw trimming devices which minimize the amount of anxiety that is created are preferred. However, clippers often require a meaningful amount of shearing force if the animal has large claws, like those of a large breed dog in comparison with those of a cat. Clippers can tend to cause anxiety because of the forces that are required and the resultant snapping sound that is heard by the animal in combination with the clipping sensation felt by the animal.

Motorized trimmers having a moving grinding element have avoided some of the shortcomings of clippers, but such motorized trimmers have typically had an elongated appearance which is held like a club by a pet owners or caregiver. Such an appearance can cause anxiety in an animal. It thus would be desirable to provide a device that overcomes certain limitations known in the relevant art.

SUMMARY

An improved trimmer is structured to be held in the palm of a user's hand. The trimmer has a grinding drum that is advantageously structured to be situated in a palmar region of the user's hand that can be said to extend from the palm and to be generally bounded by the fingertips. When the trimmer is held in the palmar region, the thumb and certain fingers can support the trimmer, and other fingers that are not necessarily employed in supporting the trimmer are usable to operate a control switch of the trimmer. The control switch controls operation of a drive motor that is connected with a grinding drum which provides abrasive surfaces that are engageable with the animal nail or claw.

Accordingly, an aspect of the disclosed and claimed concept is to provide an improved trimmer that meets certain limitations known in the relevant art.

Another aspect of the disclosed and claimed concept is to provide an improved trimmer that includes a grinding drum that is advantageously structured to be situated in a palmar region of the user's hand that can be said to extend from the palm and to be generally bounded by the fingertips.

Accordingly, an aspect of the disclosed and claimed concept is to provide an improved trimmer that is structured to be usable to trim a claw of an animal. The trimmer can be general stated as including a support apparatus, a grinding apparatus, and a control apparatus. The support apparatus can be general stated as including a housing that is structured to be held in the hand of a user. The grinding apparatus can be general stated as including a cutting element that is disposed on the housing and that is structured to be movable to trim the claw, the cutting element being structured to be situated within a palmar region of the hand that extends from the palm and that is generally bounded by the fingertips when the housing is held in the hand of the user. The control apparatus is disposed on the housing and is structured to control movement of the cutting element.

BRIEF DESCRIPTION OF THE DRAWINGS

A further understanding of the disclosed and claimed concept can be gained from the following DESCRIPTION when read in conjunction with the accompanying drawings in which:

Similar numerals refer to similar parts throughout the specification.

DESCRIPTION

Figure 1:
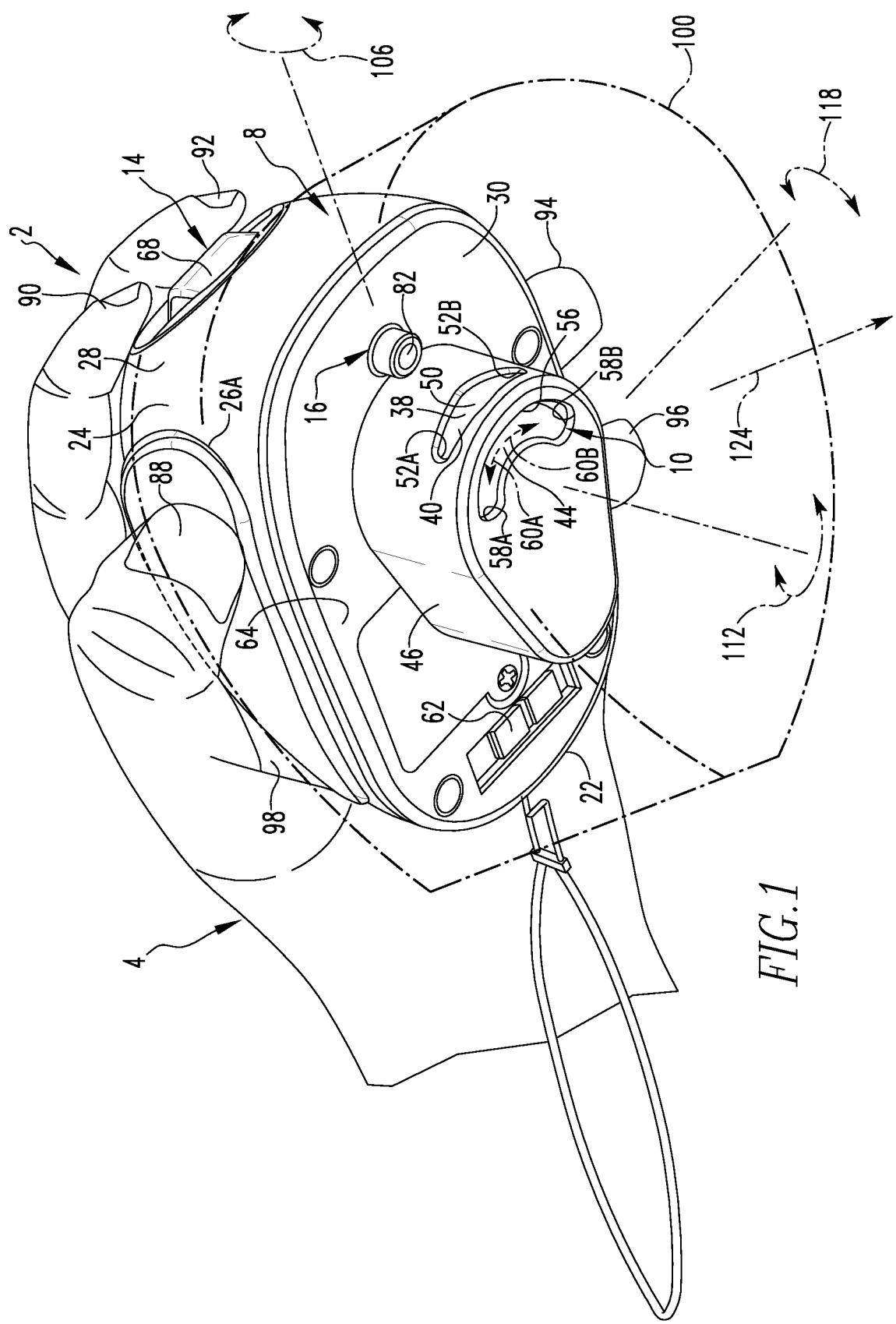
FIG. 1 is a perspective view of an improved trimmer in accordance with the disclosed and claimed concept that is situated in a palmar region of a user's hand.

An improved trimmer 2 is depicted generally in FIGS. 1-4 and is advantageously configured to enable a user to trim, grind away, shape, unsharpen, and otherwise manicure the nails or claws of pets such as dogs, cats, and the like. The trimmer 2 is depicted in FIG. 1 as being held in a hand 4 of a user. The trimmer 2 is held in the hand 4 during use and is advantageously configured such that a cutting element of the trimmer 2 is situated generally in a palmar region of the hand 4, as will be set forth in greater detail below.

The trimmer 2 can be said to include a support apparatus 8 and to further include a grinding apparatus 10, a control apparatus 14, an illumination apparatus 16, and a power apparatus 20 situated on the support apparatus 8. The control apparatus 14 can be said to include or at least partially manage operation of the grinding, illumination, and power apparatuses 10, 16, and 20.

Figure 2:
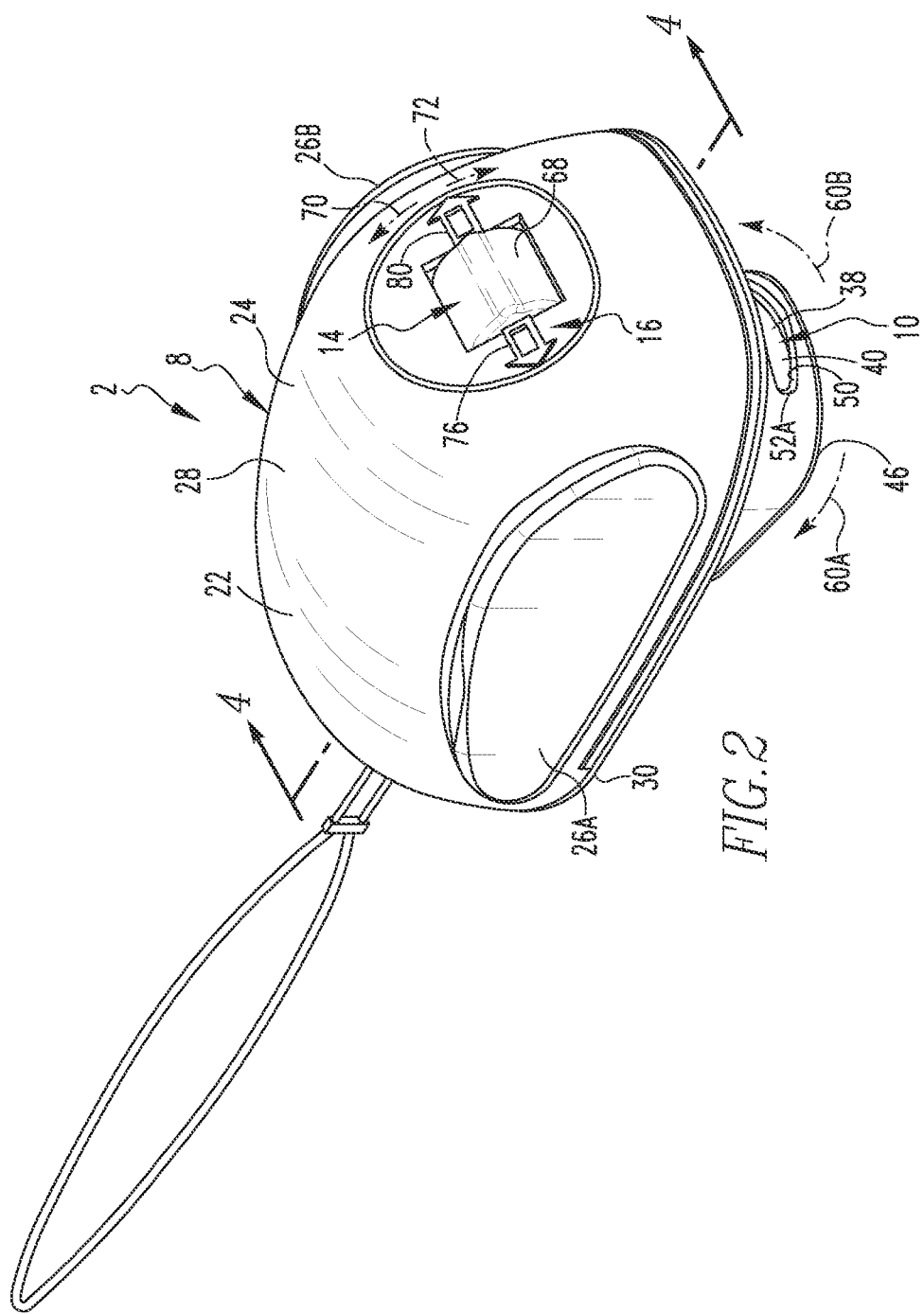
FIG. 2 is another perspective view of the trimmer of FIG. 1.
Figure 3:
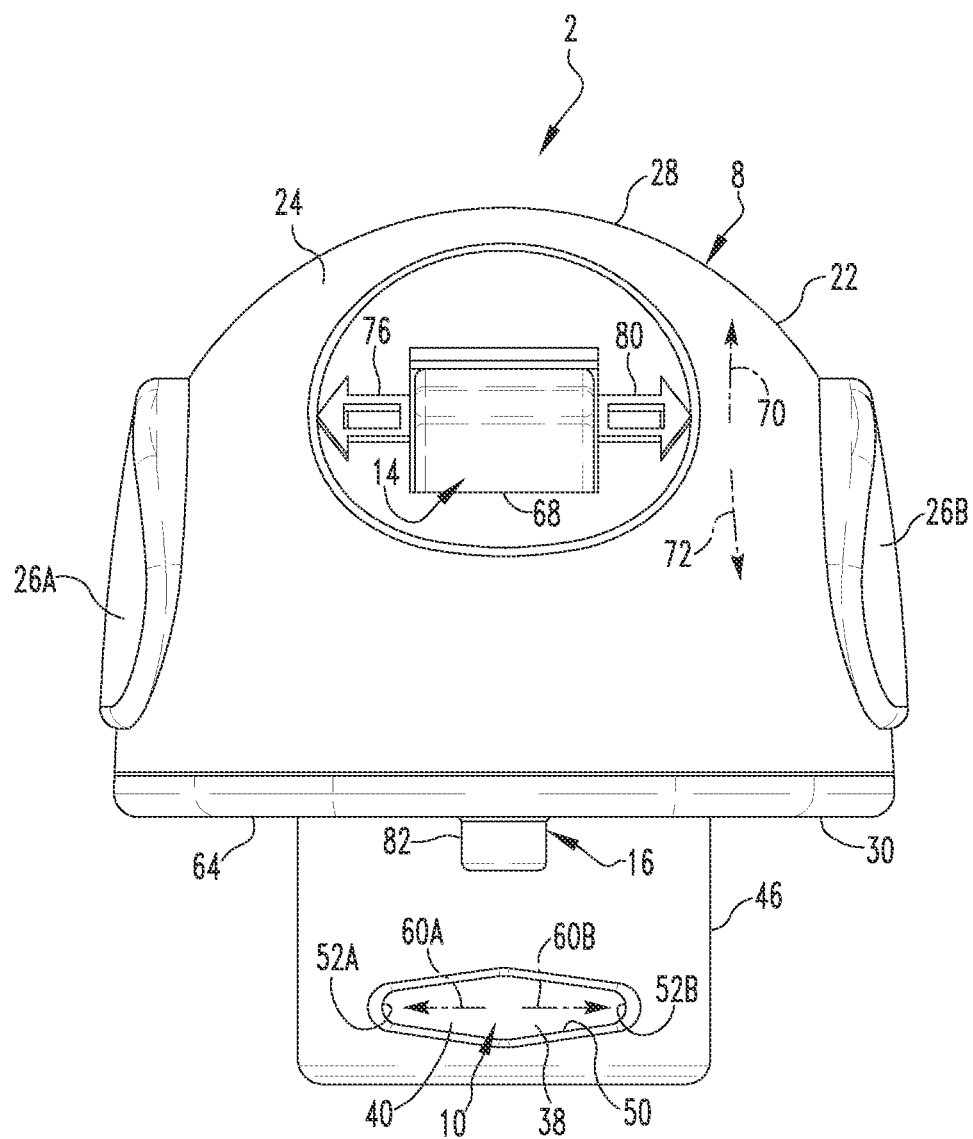
FIG. 3 is a front elevational view of the trimmer of FIG. 1.

The support apparatus 8 can be said to include a housing 22 on which are disposed portions of the grinding, control, illumination, and power apparatuses 10, 14, 16, and 20. The housing 22 can be said to include a generally domed first portion 24 having an arcuate outer surface 28. The housing 22 further includes a second portion 30 which, at its perimeter, meets the domed first portion 24 of the housing 22. The support apparatus 8 additionally includes a pair of engagement elements 26A and 26B which are best depicted in FIGS. 2 and 3 as being situated at opposite sides of the housing 22. The engagement elements 26A and 26B are depicted in FIG. 3 as protruding outwardly in opposite directions from the arcuate outer surface 28. The engagement elements 26A and 26B are engageable by portions of the hand 4 to enable the user to grip and manipulate the trimmer 2 with the hand 4 in order to manicure the nails or claws.

Figure 4:
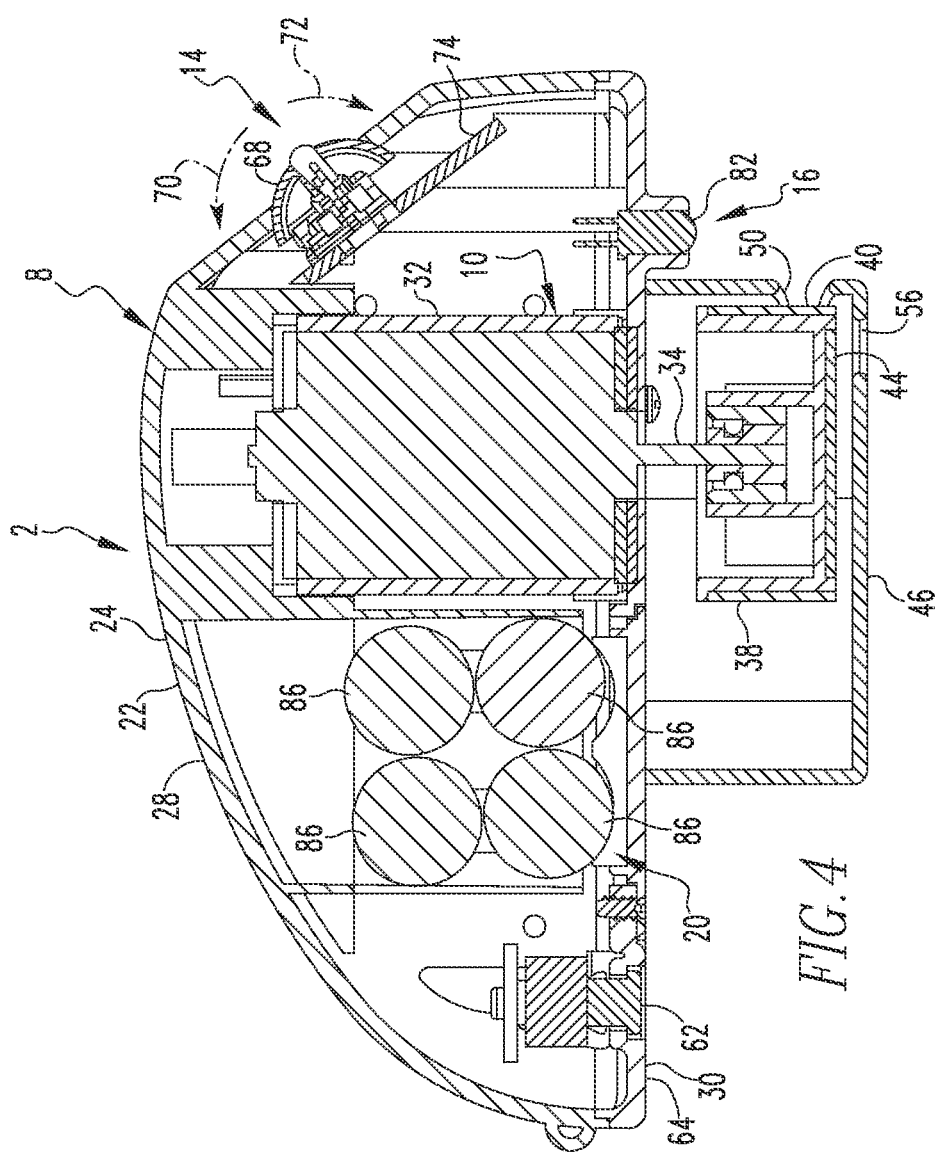
FIG. 4 is a sectional view as taken along line 4-4 of FIG. 1.

The grinding apparatus 10 includes a drive motor 32 which rotates a shaft 34 upon which is disposed a cutting element (e.g., a cutter) which is in the exemplary form of a generally cylindrical grinding drum 38. As can be seen in FIG. 4, the grinding apparatus 10 is situated generally in the central region of the housing 22. The grinding drum 38 is an abrasive element which, when rotated by the shaft 34, enables the user to grind the claws or nails of an animal, by way of example, when the claw or nail is received in contact with a cutting surface the grinding drum 38 while the drive motor 32 is in operation.

The grinding drum 38 includes a cylindrical surface 40 that is arcuate in shape and further includes a generally planar surface 44 which is circular in shape, both of which are abrasive surfaces. The grinding drum 38 is situated within a grinding shield 46 which can be said to constitute a third portion of the housing 22 and that is mounted on a substantially planar outer surface 64 of the second portion 30. That is, the outer surface 64 is substantially planar apart from the grinding shield 46 (and the grinding drum 38) that protrude therefrom. The grinding shield 46 includes an elongated first opening 50 and an elongated and arcuate second opening 56 that can receive an animal claw or nail therein in order to engage the cylindrical and/or planar surfaces 40 and 44, respectively. That is, the first and second openings 50 and 56 enable communication between the exterior of the grinding shield 46 and the interior thereof where the grinding drum 38 is situated.

As can be seen in FIGS. 1-3, the first and second openings 50 and 56 have a length substantially greater than the width, with the first opening 50 extending between a pair of ends 52A and 52B, and with the second opening 56 extending between a pair of ends 58A and 58B. The ends 52A, 52B, 58A, and 58B are enlarged and rounded in order to receive a claw of an animal against them during abrasion of the claw by the grinding drum 38. That is, the frictional abrasive force on the claw typically caused the claw to become engaged with one of the ends 52A, 52B, 58A, and 58B, and such engagement keeps the claw relatively stationary on the grinding shield 46 while the grinding drum 38 rotates and abrades the claw received through the first opening 50 or the second opening 56. The grinding shield 46 retains therein the ground-away claw material, thus reducing the mess that is generated in the grinding operation. The grinding shield 46 is removable from the second portion 30 of the housing 22 to permit cleaning of the grinding shield 46.

It is noted that the control apparatus 14 controls the drive motor 32 to rotate the shaft 34 and thus the grinding drum 38 in two opposite rotational directions. As such, the claw could be engaged with either of the ends 52A and 58A when the grinding drum 38 is rotating in a first rotational direction as is indicated at the numeral 60A in FIG. 1, and the claw could be engaged with either of the other end 52B and 58B when the grinding drum 38 is rotating in a second, opposite direction as is indicated at the numeral 60B in FIG. 1. Of course, the animal claw could alternatively simply be held in place with respect to the grinding drum 38 using the owner's other hand without necessarily engaging any of the ends 52A, 52B, 58A, and 58B.

The direction of rotation of the grinding drum 38 is controlled by a control switch 68 of the control apparatus 14. The control switch 68 is in the exemplary form of a pivotable drum that is pivotable in a first direction (as is indicated at the numeral 70 in FIGS. 2-4) from an initial position to cause the drive motor 32 to rotate the grinding drum 38 in the first rotational direction 60A. The control switch 68 is also rotatable in a second direction (as is indicated at the numeral 72 in FIGS. 2-4) from the initial position to cause the drive motor 32 to rotate the grinding drum 38 in the second rotational direction 60B. The control switch 68 may desirably be spring biased to cause it to return to its initial position when released, in which position the drive motor 32 is stopped.

The control apparatus 14 in the depicted exemplary embodiment additionally controls the rotational speed of the drive motor 32 and thus the rotational speed of the grinding drum 38. For example, a slight rotation of the control switch 68 in the first direction 70 causes the drive motor 32 to operate at a first rotational speed in the first rotational direction 60A, and a further rotation of the control switch 68 in the same direction increases the rotational speed of the grinding drum 38 in the same direction.

The control apparatus 14 includes control circuitry that provides over-current protection. For instance, if the user pushes the grinding drum 38 too hard into the nail or claw, the current supplied to the drive motor 32 will rise. The control circuitry advantageously therefore includes a limiting element that is indicated generally at the numeral 74 in FIG. 4 and which detects the current that is being supplied to the drive motor 32. If such current exceeds a predetermined threshold, the limiting element 74 will reduce the power supplied to the drive motor 32 and may also cause the trimmer 2 to be switched off.

The illumination apparatus 16 provides a first directional light 76 and a second directional light 80 that are in the exemplary form of arrow-shaped elements and which are situated at alternate ends of the control switch 68. When the control switch 68 is pivoted in the first direction 70, which causes the grinding drum 38 to rotate in the first rotational direction 60A, the first directional indicator light 76 becomes illuminated in order to visually indicate to the user the direction of rotation of the grinding drum 38 and that the ends 52A and 58A are usable for supporting the claw of the animal in a fixed position with respect to the rotating grinding drum 38. Similarly, when the control switch 68 is pivoted in the second direction 72 to cause the drive motor 32 to rotate the grinding drum 38 in the second rotational direction 60B, the second directional indicator 80 becomes illuminated in order to visually indicate to the user the direction of rotation of the grinding drum 38 and to further visually indicate that the ends 52B and 58B will be usable as stops against which the claw of the animal can be placed for grinding.

One of the first and second directional lights 76 and 80 is typically in an ON condition when the grinding drum 38 is operated in either direction. As an additional feature, however, the first and/or second directional lights 76 and 80 are caused to flash or blink after a predetermined period of continued operation. This avoids the user from holding the grinding drum 38 on a claw or nail for an excessive period of time, which advantageously avoids building up excessive heat in the claw or nail and making the animal uncomfortable. Any predetermined period of time can be employed, but the exemplary period employed herein if fifteen seconds. Moreover, the aforementioned change in the illumination of the first and/or second directional lights 76 and 80 to cause them to flash or blink is exemplary in nature, and it is noted that any other type of visual change to the illumination, such as a change in brightness, color, etc., can be employed without departing from the present concept.

The illumination apparatus 16 further includes a lamp in the exemplary form of an illuminator light 82 that is directed out of the surface 64 of the second portion 30 and which serves to illuminate at least the first opening 52 and the animal claw that is being applied to the grinding drum 38. The illuminator light 82 can become illuminated by operation of an ON/OFF switch 62 of the control apparatus 14 that is situated on the second portion 30. The ON/OFF switch 62 can be used to switch the illuminator light 82 between an illuminated condition and a non-illuminated condition. Moreover, the ON/OFF switch 62 can be employed to switch the drive motor 32 between an ON condition, i.e., an operable condition wherein a pivoting of the control switch 68 will initiate rotation of the drive motor 32, and an OFF condition, i.e., a non-operational condition. Furthermore, the ON/OFF switch 62 may be configured to have a plurality of positions whereby the illuminator light 82 and the drive motor 32 are independently controllable. That is, depending upon the position of the ON/OFF switch 62, the illuminator light 82 or the drive motor 32 or both are in an operational condition.

The exemplary power apparatus 20 includes a number of batteries 86 which may be conventional batteries or rechargeable batteries. As employed herein, the expression "a number of" and variations thereof shall refer broadly to any non-zero quantity, including a quantity of one. The power apparatus 20 can alternatively include other types of power sources such as capacitors, wound springs, and the like without limitation.

As can be understood from FIG. 1, the user's hand 4 can be said to include a thumb 88 that is depicted in FIG. 1 as being engaged with the engagement element 26A. The hand 4 further includes a first finger 90 and a second finger 92 which are depicted as being situated along the arcuate outer surface 28 of the housing 22 in proximity to the control switch 68. The hand 4 further includes a third finger 94 and a fourth finger 96 that are depicted in FIG. 1 as being engaged with the engagement element 26B. The hand 4 also includes a palm 98 from which the thumb 88 and the first through fourth fingers 90-96 extend. In the depicted exemplary embodiment, a portion of the palm 98 is engaged with a portion of the arcuate outer surface 28 of the housing 22. In use, at least a portion of the outer surface 28 faces generally toward the palm 98 and is situated adjacent thereto. Likewise in use, the surface 64 of the second portion 30 faces generally away from the palm 98.

As can further be understood from FIG. 1, the thumb 88 and the first through fourth fingers 90-96 and, more particularly, the fingertips of such digits, are employed by the user to retain the trimmer 2 in the hand 4, to control the orientation and movement of the trimmer 2, and to control operation of drive motor 32 and the other features of the trimmer 2. As a general matter, the trimmer 2 may be situated between the thumb 88 (engaged with the engagement element 26A) and the third and/or fourth fingers 94 and 96 (engaged with the engagement element 26B). Such digits or other digits may be engaged with the engagement elements 26A and 26B and enable the user to control movement of the trimmer 2 in a roll direction indicated generally at the numeral 106 in FIG. 1 and in a yaw direction as is indicated generally at the numeral 112 in FIG. 1. The first and/or second fingers 90 and 92 are operable to operate the control switch 68, to stabilize the trimmer 2 during movement in the roll and yaw directions 106 and 112, and to help the user to move the trimmer 2 in a pitch direction that is indicated generally at the numeral 118 in FIG. 1. The configuration of the trimmer 2 thus advantageously enables its operation to be easily controlled by the user because certain of the digits of the hand 4 are used to support the trimmer 2 via the engagement elements 26A and 26B, and other digits that are not necessarily required for supporting the trimmer 2 are employable to operate the control switch 68. It is expressly noted, however, that any of the aforementioned digits can be employed in assisting with operating the control switch 68, supporting the trimmer 2, and moving it in any of the roll, yaw, and pitch directions 106, 112, and 118 without limitation. Moreover, while a user's left hand 4 is depicted as holding the trimmer 2, it is noted that the trimmer 2 could alternatively be held by the user's right hand and function in exactly the same way.

Further advantageously, the trimmer 2 is configured such that the grinding drum 38 is disposed generally within an elongated palmar region 100 that can be said to extend away from the palm 98 and to be bounded in the lateral direction by the tips of the thumb 88 and the first through fourth fingers 90-96. That is, the palmar region 100 can be said to extend in a direction 124 (FIG. 1) generally away from the palm 98 and that is bounded in a direction perpendicular to the direction 124 by the tips of the thumb 88 and the first through fourth fingers 90-96. By configuring the grinding drum 38 to be situated in the palmar region 100, the relatively small and compact trimmer 2 can be at least somewhat concealed by the user and does not take the shape of an elongated stick or club which can cause anxiety in an animal. Also, by providing the palmar orientation of the grinding drum 38, the user can easily control the movement and position of the trimmer 2 with respect to the roll, yaw, and pitch direction 106, 112, and 118 through the use of slight movements of the thumb 88 and/or any of the first through fourth fingers 90-96 and/or with movements of the wrist. Moreover, the ability to control the rotational speed of the grinding drum 38 with the control apparatus 14 advantageously enables the user to limit the noise and vibration that are generated by the trimmer 2 during operation in order to further reduce the anxiety of the animal. Further benefits will be apparent to one of ordinary skill in the relevant art.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A trimmer that is structured to be usable to trim a claw of an animal, the trimmer comprising:
    a housing that is structured to be held in the hand of a user, the housing including a user contact surface defining an arcuate surface for being held in the palm of the user;
    a switch that operates the trimmer arranged at the user contact surface for user operating the switch when the trimmer is held in the palm;
    a grinding apparatus comprising a cutter that is movable to trim the claw, the grinding apparatus being structured to be situated within a palmar region of the hand that extends from the palm and that is generally bounded by the fingertips when the housing is held in the hand of the user; and
    a grinding shield that forms a wall around the cutter, the grinding shield extending from another surface of the housing that is an opposing surface of the user contact surface, the grinding shield including a first opening that faces in a direction away from the user contact surface and a second opening that faces in another direction that is perpendicular to the direction that the first opening faces, the first and second openings being configured to receive a pet claw for cutting by the cutter.

2. The trimmer of claim 1 wherein the cutter comprising an abrasive element, and the trimmer further comprises a control apparatus having a motor that is structured to rotate the abrasive element and the switch is structured to control operation of the motor.

3. The trimmer of claim 2 wherein the motor is structured to rotate the abrasive element in two opposite directions responsive to operation of the switch.

4. The trimmer of claim 3 wherein the switch is movable in a first direction and in a second direction, the abrasive element being structured to rotate in a first direction responsive to movement of the switch in the first direction, the abrasive element being structured to rotate in a second direction responsive to movement of the switch in the second direction.

5. The trimmer of claim 4 wherein the grinding apparatus is structured to rotate the abrasive element in the first direction at a velocity when the switch is pivoted a distance in the first direction, and wherein the grinding apparatus is structured to rotate the abrasive element in the first direction at a relatively greater velocity when the switch is pivoted a relatively greater distance in the first direction.

6. The trimmer of claim 3 wherein the control apparatus further comprising an illumination apparatus having at least a first illumination element that is structured to become illuminated when the cutter is rotated.

7. The trimmer of claim 6 wherein the at least first illumination element comprises a first directional light and a second directional light, the first directional light being structured to be illuminated when the abrasive element is rotated in the first direction and being further structured to provide a visual indication representative of the first direction, the second directional light being structured to be illuminated when the abrasive element is rotated in the second direction and being further structured to provide a visual indication representative of the second direction.

8. The trimmer of claim 7 wherein the first and second directional lights are situated at alternate sides of the switch.

9. The trimmer of claim 6 wherein the at least first illumination element comprises a lamp which, when illuminated, is structured to provide illumination in the vicinity of the cutter.

10. The trimmer of claim 6 wherein the illumination of the at least first illumination element is structured to be visibly altered responsive to a continued rotation of the cutter for a predetermined period of time.

11. The trimmer of claim 2 wherein the abrasive element comprises a substantially planar abrasive portion and an arcuate abrasive portion.

12. The trimmer of claim 1 wherein the user contact surface defines a domed first portion of the housing, at least a portion of the first portion is structured to be situated adjacent the palm, the housing further comprising a second portion from which the cutter protrudes and which is otherwise generally planar.

13. The trimmer of claim 12 wherein the control apparatus comprises a motor that is structured to rotate the abrasive element and the switch is structured to control operation of the motor, the switch being situated on the first portion.

14. The trimmer of claim 12 wherein the housing further comprises a third portion situated on the second portion and structured to at least partially cover the cutter.

15. The trimmer of claim 12 wherein the cutter comprises a substantially planar cutting surface and an arcuate cutting surface;
the third portion includes an arcuate opening formed therein that provides access to the substantially planar cutting surface; and
the third portion further includes another opening formed therein that provides access to the arcuate cutting surface.

16. The trimmer of claim 1 wherein the trimmer includes another housing that extends from the another surface, the cutter being housed in the another housing and the motor being housed in the housing.

17. The trimmer of claim 16 wherein the grinding apparatus further includes a shaft extending between the housing and the another housing to operatively connect the motor and the cutter.

* * * * *